US010376772B1

(12) United States Patent
Doerksen et al.

(10) Patent No.: US 10,376,772 B1
(45) Date of Patent: Aug. 13, 2019

(54) SUSPENSION SYSTEM FOR ONE-WHEELED VEHICLE

(71) Applicant: Future Motion, Inc., Santa Cruz, CA (US)

(72) Inventors: Kyle Jonathan Doerksen, Santa Cruz, CA (US); Matthew Michael O'Brien, Hermosa Beach, CA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 16/397,387

(22) Filed: Apr. 29, 2019

Related U.S. Application Data

(63) Continuation of application No. 15/972,469, filed on May 7, 2018, now Pat. No. 10,272,319, which is a
(Continued)

(51) Int. Cl.
  *A63C 17/12* (2006.01)
  *A63C 17/00* (2006.01)
(Continued)

(52) U.S. Cl.
  CPC .......... *A63C 17/0046* (2013.01); *A63C 17/08* (2013.01); *B62K 11/007* (2016.11); *B62K 25/00* (2013.01); *A63C 17/01* (2013.01); *A63C 17/12* (2013.01); *A63C 2203/12* (2013.01); *A63C 2203/18* (2013.01); *A63C 2203/20* (2013.01); *A63C 2203/24* (2013.01); *A63C 2203/42* (2013.01); *B60L 15/20* (2013.01); *B60L 2200/14* (2013.01); *B60L 2200/16* (2013.01); *B60L 2260/34* (2013.01); *Y02T 10/645* (2013.01); *Y02T 10/72* (2013.01); *Y02T 10/7275* (2013.01)

(58) Field of Classification Search
  CPC .......... A63C 17/12; A63C 17/14; B62K 11/00
  See application file for complete search history.

(56) References Cited

U.S. PATENT DOCUMENTS 1,585,258 A  5/1926  Moore
4,023,864 A  5/1977  Lang et al.
(Continued)

FOREIGN PATENT DOCUMENTS

CN  102527024 B  1/2015
CN  105774992 A  7/2016
(Continued)

OTHER PUBLICATIONS

Ben Smither, Balancing Scooter / Skateboard:, video, retrieved Sep. 22, 2016 from https://www.youtube.com/watch?v=HGbbag9dkIU, uploaded to YouTube on Mar. 4, 2007.
(Continued)

*Primary Examiner* — James A Shriver, II
*Assistant Examiner* — James J Triggs
(74) *Attorney, Agent, or Firm* — Kolitch Romano LLP

(57) ABSTRACT

A self-propelled, one-wheeled vehicle may include a suspension system configured to provide arcuate, generally vertical motion of a board relative to an axle of a central wheel assembly when the vehicle encounters obstacles and bumps on a riding surface. Illustrative suspension systems may include a shock absorber and a swingarm that couple the wheel assembly to the board.

20 Claims, 11 Drawing Sheets

Related U.S. Application Data continuation of application No. 15/730,345, filed on Oct. 11, 2017, now Pat. No. 9,962,597.

(60) Provisional application No. 62/406,691, filed on Oct. 11, 2016.

(51) Int. Cl.
    *B62K 11/00*    (2006.01)
    *A63C 17/08*    (2006.01)
    *B62K 25/00*    (2006.01)
    *A63C 17/01*    (2006.01)
    *B60L 15/20*    (2006.01)

(56) References Cited

U.S. PATENT DOCUMENTS

| | | |
|---|---|---|
| 4,039,200 A | 8/1977 | McGonegle |
| 4,106,786 A | 8/1978 | Talbott |
| 4,109,741 A | 8/1978 | Gabriel |
| 4,997,196 A | 3/1991 | Wood |
| 5,000,470 A | 3/1991 | Kamler et al. |
| 5,119,277 A | 6/1992 | Copley et al. |
| 5,119,279 A | 6/1992 | Makowsky |
| 5,132,883 A | 7/1992 | La Lumandier |
| 5,462,302 A | 10/1995 | Leitner |
| 5,487,441 A | 1/1996 | Endo et al. |
| 5,509,679 A | 4/1996 | Leitner |
| 5,513,080 A | 4/1996 | Magle et al. |
| 5,553,881 A | 9/1996 | Klassen et al. |
| 5,628,524 A | 5/1997 | Klassen et al. |
| 5,794,730 A | 8/1998 | Kamen |
| 6,050,357 A | 4/2000 | Staelin et al. |
| 6,206,397 B1 | 3/2001 | Klassen et al. |
| 6,223,104 B1 | 4/2001 | Kamen et al. |
| 6,242,701 B1 | 6/2001 | Breed et al. |
| 6,288,505 B1 | 9/2001 | Heinzmann et al. |
| 6,332,103 B1 | 12/2001 | Steenson, Jr. et al. |
| 6,408,240 B1 | 6/2002 | Morrell et al. |
| 6,488,301 B2 | 12/2002 | Klassen et al. |
| 6,536,788 B1 | 3/2003 | Kuncz et al. |
| 6,538,411 B1 | 3/2003 | Field et al. |
| 6,553,271 B1 | 4/2003 | Morrell |
| 6,561,294 B1 | 5/2003 | Kamen et al. |
| 6,779,621 B2 | 8/2004 | Kamen et al. |
| 6,789,640 B1 | 9/2004 | Arling et al. |
| 6,827,163 B2 | 12/2004 | Amsbury et al. |
| 6,874,591 B2 | 4/2005 | Morrell et al. |
| 6,932,371 B2 | 8/2005 | Perez |
| 6,965,206 B2 | 11/2005 | Kamen et al. |
| 6,992,452 B1 | 1/2006 | Sachs et al. |
| 7,023,330 B2 | 4/2006 | Kamen et al. |
| 7,053,289 B2 | 5/2006 | Iwai et al. |
| RE39,159 E | 7/2006 | Klassen et al. |
| 7,090,040 B2 | 8/2006 | Kamen et al. |
| 7,091,724 B2 | 8/2006 | Heinzmann et al. |
| 7,130,702 B2 | 10/2006 | Morrell |
| 7,138,774 B2 | 11/2006 | Negoro et al. |
| 7,157,875 B2 | 1/2007 | Kamen et al. |
| 7,172,044 B2 | 2/2007 | Bouvet |
| 7,198,280 B2 | 4/2007 | Hara |
| 7,263,453 B1 | 8/2007 | Gansler et al. |
| D551,592 S | 9/2007 | Chang et al. |
| 7,424,927 B2 | 9/2008 | Hiramatsu |
| 7,467,681 B2 | 12/2008 | Hiramatsu |
| 7,479,097 B2 | 1/2009 | Rosborough et al. |
| 7,581,743 B2 | 9/2009 | Graney |
| 7,740,099 B2 | 6/2010 | Field et al. |
| 7,757,794 B2 | 7/2010 | Heinzmann et al. |
| 7,789,174 B2 | 9/2010 | Kamen et al. |
| 7,811,217 B2 | 10/2010 | Odien |
| 7,857,088 B2 | 12/2010 | Field et al. |
| 7,900,725 B2 | 3/2011 | Heinzmann et al. |
| 7,962,256 B2 | 6/2011 | Stevens et al. |
| 7,963,352 B2 | 6/2011 | Alexander |
| 7,979,179 B2 | 7/2011 | Gansler |
| 8,052,293 B2 | 11/2011 | Hurwitz |
| 8,066,297 B2 | 11/2011 | Beale et al. |
| 8,083,313 B2 | 12/2011 | Karppinen et al. |
| 8,146,696 B2 | 4/2012 | Kaufman |
| 8,170,780 B2 | 5/2012 | Field et al. |
| 8,272,657 B2 | 9/2012 | Graney et al. |
| 8,382,136 B2 | 2/2013 | Beale et al. |
| 8,467,941 B2 | 6/2013 | Field et al. |
| 8,490,723 B2 | 7/2013 | Heinzmann et al. |
| 8,562,386 B2 | 10/2013 | Carlson et al. |
| 8,682,487 B2 | 3/2014 | Kurth et al. |
| 9,101,817 B2 | 8/2015 | Doerksen |
| D746,928 S | 1/2016 | Doerksen |
| 9,387,363 B1 | 7/2016 | Polinsky |
| 9,400,505 B2 | 7/2016 | Doerksen |
| 9,452,345 B2 | 9/2016 | Doerksen et al. |
| D768,252 S | 10/2016 | Bigler |
| D769,997 S | 10/2016 | Doerksen |
| 9,707,470 B2 * | 7/2017 | Ma ................ B62K 11/007 |
| 9,962,597 B2 | 5/2018 | Doerksen et al. |
| 2005/0241864 A1 | 11/2005 | Hiramatsu |
| 2006/0038520 A1 | 2/2006 | Negoro et al. |
| 2006/0049595 A1 | 3/2006 | Crigler et al. |
| 2006/0170174 A1 | 8/2006 | Hiramatsu |
| 2006/0213711 A1 | 9/2006 | Hara |
| 2006/0260862 A1 | 11/2006 | Nishikawa |
| 2007/0194558 A1 | 8/2007 | Stone et al. |
| 2007/0254789 A1 | 11/2007 | Odien |
| 2009/0261557 A1 | 10/2009 | Beale et al. |
| 2011/0109060 A1 | 5/2011 | Earle et al. |
| 2011/0309772 A1 | 12/2011 | Forgey |
| 2012/0232734 A1 | 9/2012 | Pelletier |
| 2013/0081891 A1 | 4/2013 | Ulmen et al. |
| 2013/0175943 A1 | 7/2013 | Tackett |

FOREIGN PATENT DOCUMENTS

| | | |
|---|---|---|
| TW | 450823 B | 8/2001 |
| WO | 93/13974 A1 | 7/1993 |
| WO | 2009071879 A9 | 6/2009 |

OTHER PUBLICATIONS www.electricunicycle.com, "Leviskate self-balancing one-wheel skateboard", video, retrieved Sep. 22, 2016 from https://www.youtube.com/Watch?v=462Jj1xSSqc, uploaded to YouTube on Aug. 5, 2007.

John Xenon, "One wheel self balancing skateboard Ver2 Jan. 2009. #2", video, retrieved Sep. 22, 2016 from https://www.youtube.com/Watch?v=8RPFNUsuW78, uploaded to YouTube on Jan. 3, 2009.

Rodger Cleye, "Leviskate (Balancing Skateboard) in Operation", video, retrieved Sep. 22, 2016 from https://www.youtube.com/watch?v=eN2J8m_E0go, uploaded to YouTube on Apr. 18, 2013.

* cited by examiner

US 10,376,772 B1

SUSPENSION SYSTEM FOR ONE-WHEELED VEHICLE

CROSS-REFERENCES

This application claims the benefit under 35 U.S.C. § 119(e) of the priority of U.S. Provisional Patent Application Ser. No. 62/406,691, filed Oct. 11, 2016, the entirety of which is hereby incorporated by reference for all purposes. The following related applications and materials are incorporated herein, in their entireties, for all purposes: U.S. Pat. Nos. 9,101,817; 9,452,345; U.S. patent application Ser. No. 14/934,024; U.S. patent application Ser. No. 15/063,071.

FIELD

This disclosure relates to systems and methods for isolating a one-wheeled vehicle frame from certain effects of uneven terrain. More specifically, the disclosed embodiments relate to suspension systems for one-wheeled vehicles.

SUMMARY

The present disclosure provides systems, apparatuses, and methods relating to suspension systems for self-propelled one-wheeled vehicles. In some embodiments, a shock absorbing, self-balancing electric skateboard may include a board including first and second deck portions each configured to receive a left or right foot of a rider oriented generally perpendicular to a direction of travel of the board; a wheel assembly including exactly one rotatable wheel disposed between and extending above the first and second deck portions; a motor assembly configured to rotate the wheel around an axle to propel the skateboard; at least one sensor configured to measure orientation information of the board; a motor controller configured to receive orientation information measured by the sensor and to cause the motor assembly to propel the skateboard based on the orientation information; a compressible shock absorber; a first linkage assembly connecting a first end of the shock absorber to the board; and a second linkage assembly connecting a second end of the shock absorber to the wheel; wherein at least one member of one of the linkage assemblies is rotatable on an axis extending perpendicular to the direction of travel of the board, and wherein compression of the shock absorber is configured to allow the board to move relative to the wheel in response to bumps encountered by the wheel.

In some examples, a self-balancing electric vehicle may include a board defining a riding plane and including first and second deck portions each configured to receive a left or right foot of a rider oriented generally perpendicular to a direction of travel of the board; at least one rotatable wheel disposed between the first and second deck portions, and extending above and below the board; a hub motor configured to rotate the wheel to propel the vehicle; at least one sensor configured to measure orientation information of the board; a motor controller configured to receive orientation information measured by the sensor and to cause the hub motor to propel the skateboard based on the orientation information; a compressible shock absorber; and a linkage assembly operatively connecting one end of the shock absorber to the board and another end of the shock absorber to the wheel, wherein compression of the shock absorber is configured to allow arcuate, generally vertical motion of the at least one wheel relative to the riding plane as the wheel encounters obstacles.

In some examples, a self-balancing electric vehicle may include a board defining a riding plane and configured to receive left and right feet of a rider oriented generally perpendicular to a direction of travel of the board; at least one rotatable wheel disposed between and extending above and below the board; a motor configured to rotate the wheel around an axis of rotation to propel the vehicle; at least one sensor configured to measure orientation information of the board; a motor controller configured to receive orientation information measured by the sensor and to cause the motor to propel the skateboard based on the orientation information; and a linkage assembly linking the wheel to the board, the linkage assembly including: first and second extension arms, each rotatably attached to a respective lateral side of the wheel; a connecting member rigidly interconnecting the extension arms; a shock absorber having a first end coupled to the connecting member; and a first coupling member joining a second end of the shock absorber to the board; wherein the linkage assembly is configured to allow the riding plane of the board to move in an arcuate, generally vertical direction relative to the axis of rotation of the at least one wheel, in response to bumps encountered by the wheel.

Features, functions, and advantages may be achieved independently in various embodiments of the present disclosure, or may be combined in yet other embodiments, further details of which can be seen with reference to the following description and drawings.

DESCRIPTION

Various aspects and examples of swingarm suspension systems for one-wheeled vehicles, as well as related methods, are described below and illustrated in the associated drawings. Unless otherwise specified, a one-wheeled vehicle having a swingarm suspension system, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be essentially conforming to the particular dimension, range, shape, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

Overview

Figure 1:
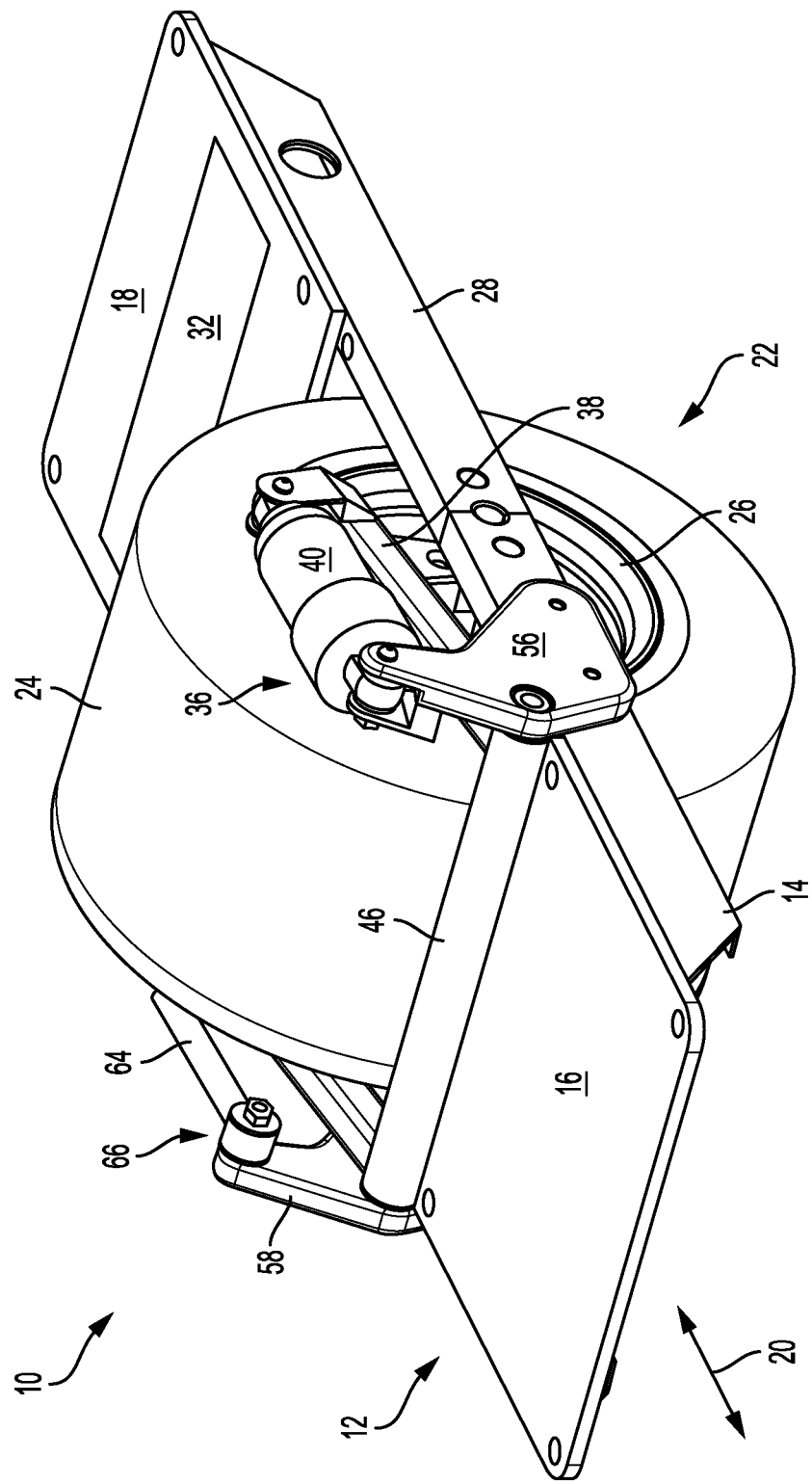
FIG. 1 is an isometric oblique view of an illustrative one-wheeled vehicle having a suspension system in accordance with aspects of the present disclosure.
Figure 2:
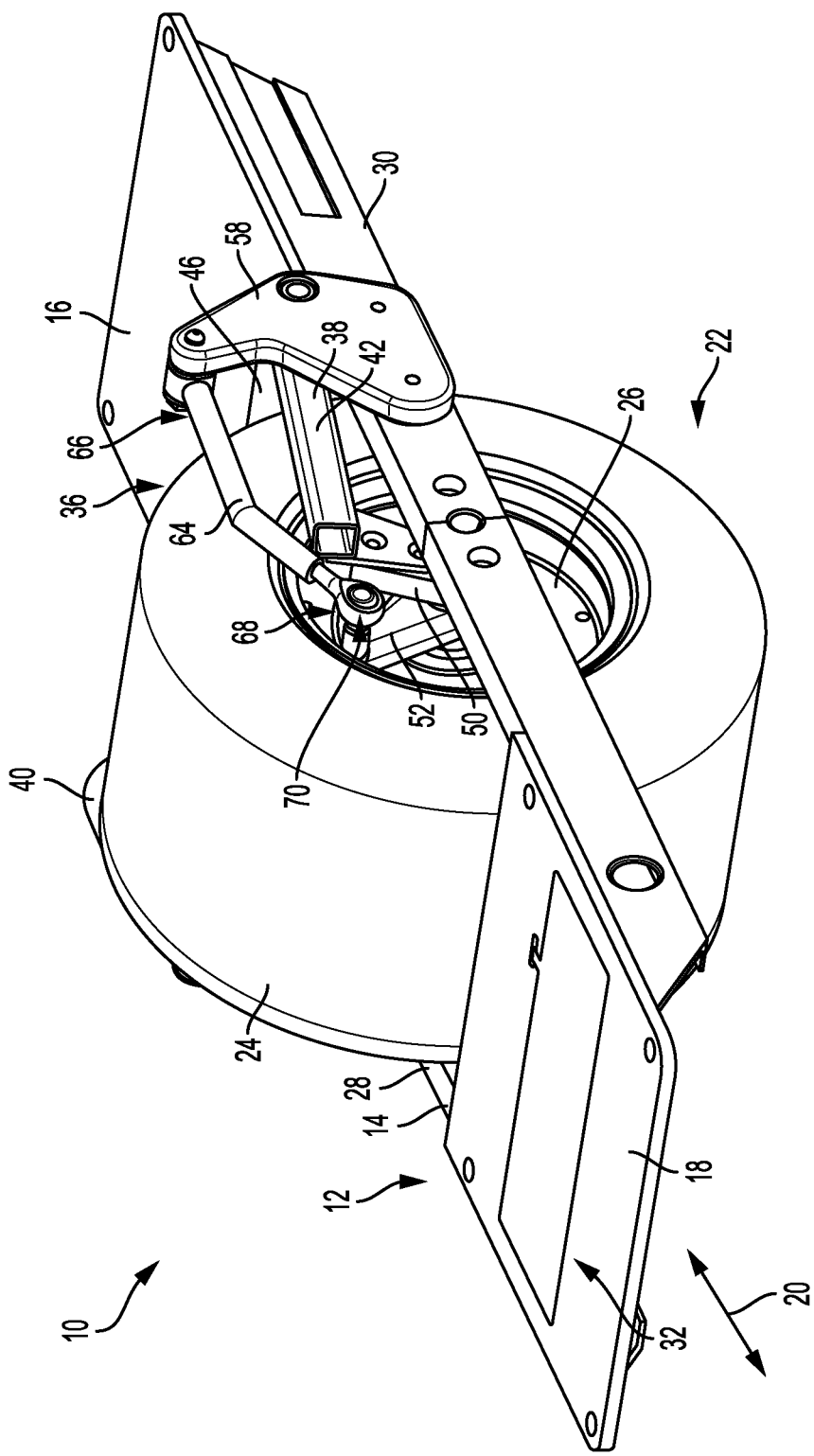
FIG. 2 is another isometric oblique view of the vehicle of FIG. 1.
Figure 3:
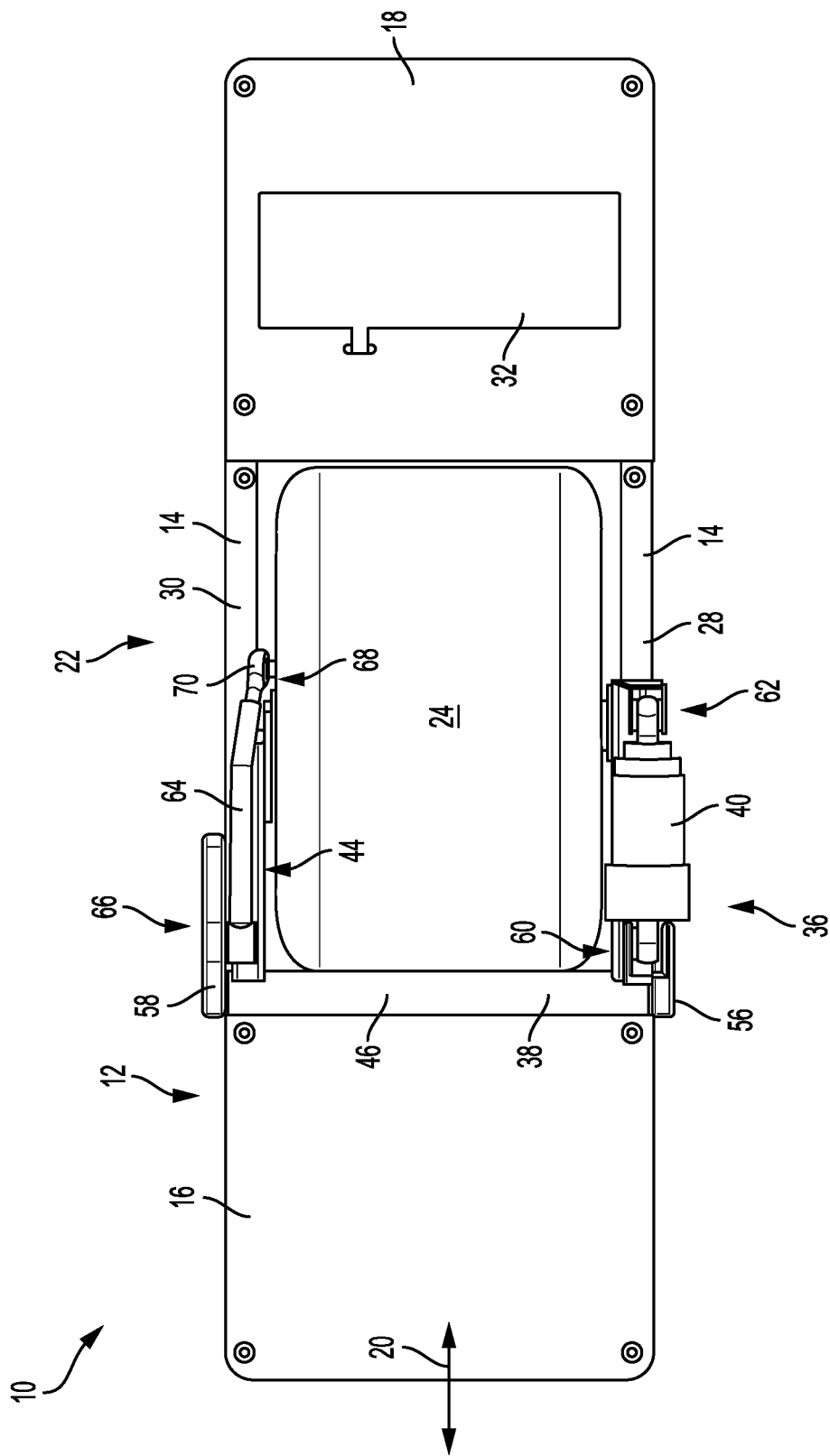
FIG. 3 is an overhead plan view of the vehicle of FIG. 1.

In general, and as shown in FIGS. 1-3, suspension systems according to the present teachings may be suitable for one-wheeled electric vehicles, such as vehicle 10.

Vehicle 10 is a one-wheeled, self-stabilizing skateboard substantially similar in its non-suspension aspects to the electric vehicles described in U.S. Pat. No. 9,101,817 (the '817 patent), the entirety of which is hereby incorporated herein for all purposes. Accordingly, vehicle 10 includes a board 12 defining a riding plane and having a frame 14 supporting a first deck portion 16 and a second deck portion 18 (collectively referred to as the foot deck). Each deck portion 16, 18 is configured to receive a left or right foot of a rider oriented generally perpendicular to a direction of travel of the board, said direction of travel generally indicated at 20.

Vehicle 10 also includes a wheel assembly 22. Wheel assembly 22 includes a rotatable ground-contacting element 24 (e.g., a tire, wheel, or continuous track) disposed between and extending above the first and second deck portions 16, 18, and a hub motor 26 configured to rotate ground-contacting element 24 to propel the vehicle. As shown in FIG. 1, vehicle 10 may include exactly one ground-contacting element. In some examples, vehicle 10 may include two wheels disposed side by side and sharing a common axis of rotation.

As described in the '817 patent, vehicle 10 includes at least one sensor configured to measure orientation information of the board, and a motor controller configured to receive orientation information measured by the sensor and to cause hub motor 26 to propel the skateboard based on the orientation information.

Frame 14 may include any suitable structure configured to rigidly support the deck portions and to be coupled to an axle of the wheel assembly, such that the weight of a rider may be supported on tiltable board 12 having a fulcrum at the wheel assembly axle. Frame 14 may include one or more frame members, such as frame members 28 and 30, on which deck portions 16 and 18 may be mounted, and which may further support additional elements and features of the vehicle, such as a charging port, end bumpers, lighting assemblies, battery and electrical systems, electronics, controllers, and the like (not shown).

Deck portions 16 and 18 may include any suitable structures configured to support the feet of a rider, such as non-skid surfaces, as well as vehicle-control features, such as a rider detection system 32. Illustrative deck portions, including other suitable rider detection systems, are described in the '817 patent, as well as in U.S. Pat. No. 9,452,345, the entirety of which is hereby included herein for all purposes.

A shaft 34 of hub motor 26 is coupled to frame 14 by a suspension system 36, as shown in FIGS. 1-3. Suspension system 36 is a swingarm-type suspension having a swingarm 38 damped by a damper or shock absorber 40. Various aspects and examples relating to system 36 are described in greater detail below.

EXAMPLES, COMPONENTS, AND ALTERNATIVES

The following sections describe selected aspects of exemplary suspension systems for one-wheeled vehicles, as well as related systems and/or methods. The examples in these sections are intended for illustration and should not be interpreted as limiting the entire scope of the present disclosure. Each section may include one or more distinct inventions, and/or contextual or related information, function, and/or structure.

A. Illustrative Swingarm Suspension

With reference to FIGS. 1-8, this section describes suspension system 36 in greater detail.

Figure 4:
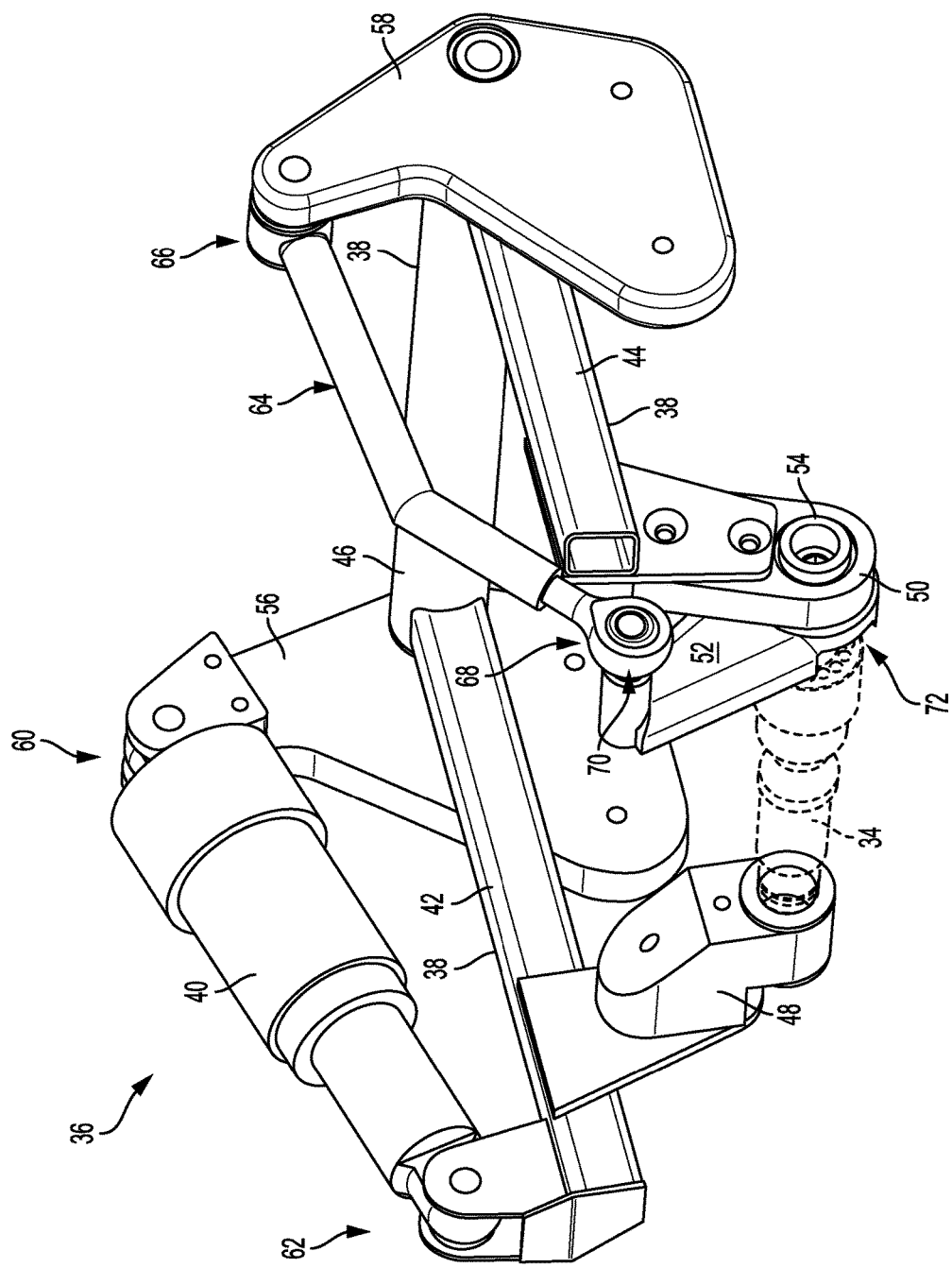
FIG. 4 is a first isometric oblique view of selected elements associated with illustrative suspension systems disclosed herein, showing relationships between various components.
Figure 5:
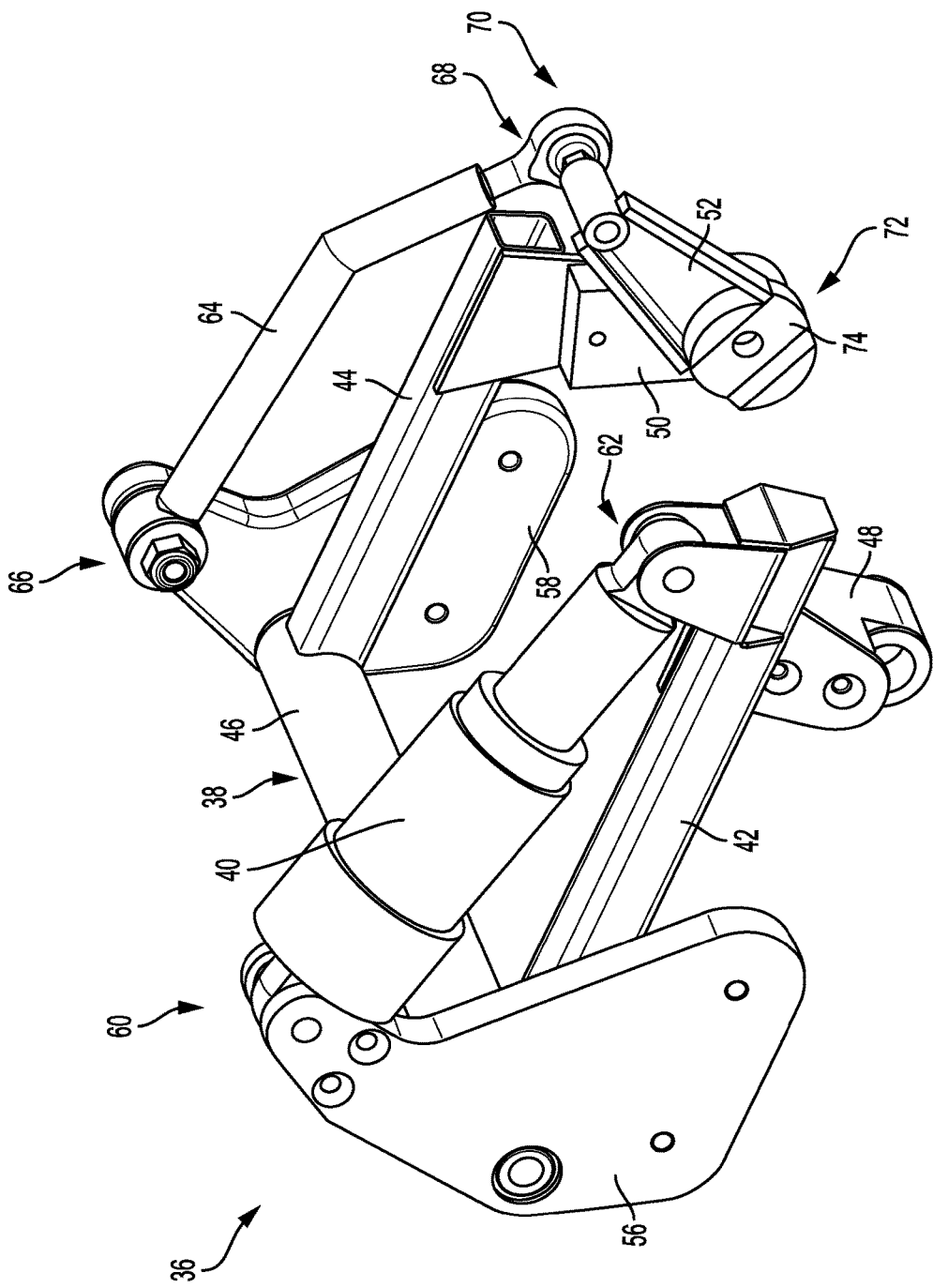
FIG. 5 is a second isometric oblique view of the selected elements of FIG. 4.
Figure 6:
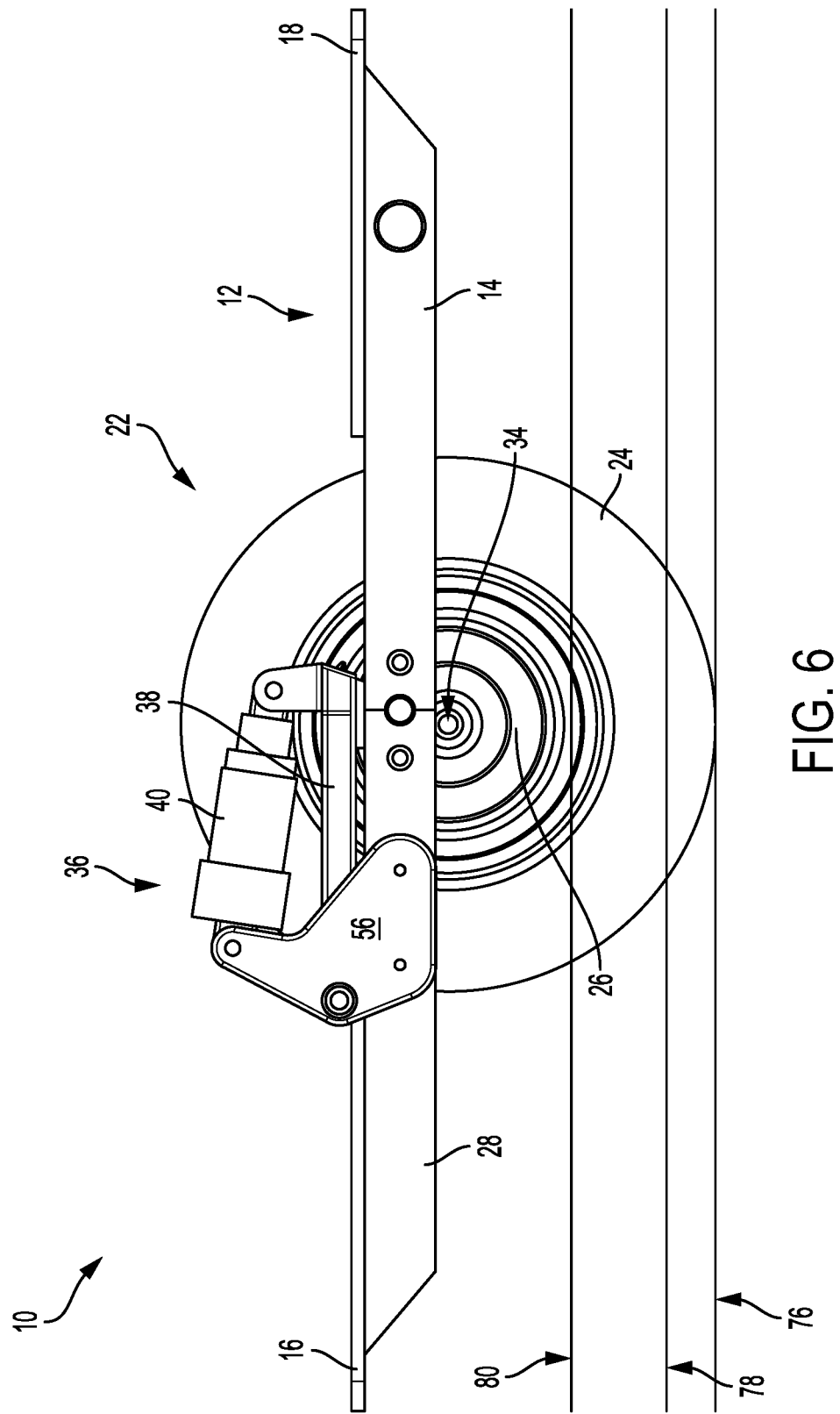
FIG. 6 is a side elevation view of the vehicle of FIG. 1 with the suspension system in a first state of compression.
Figure 7:
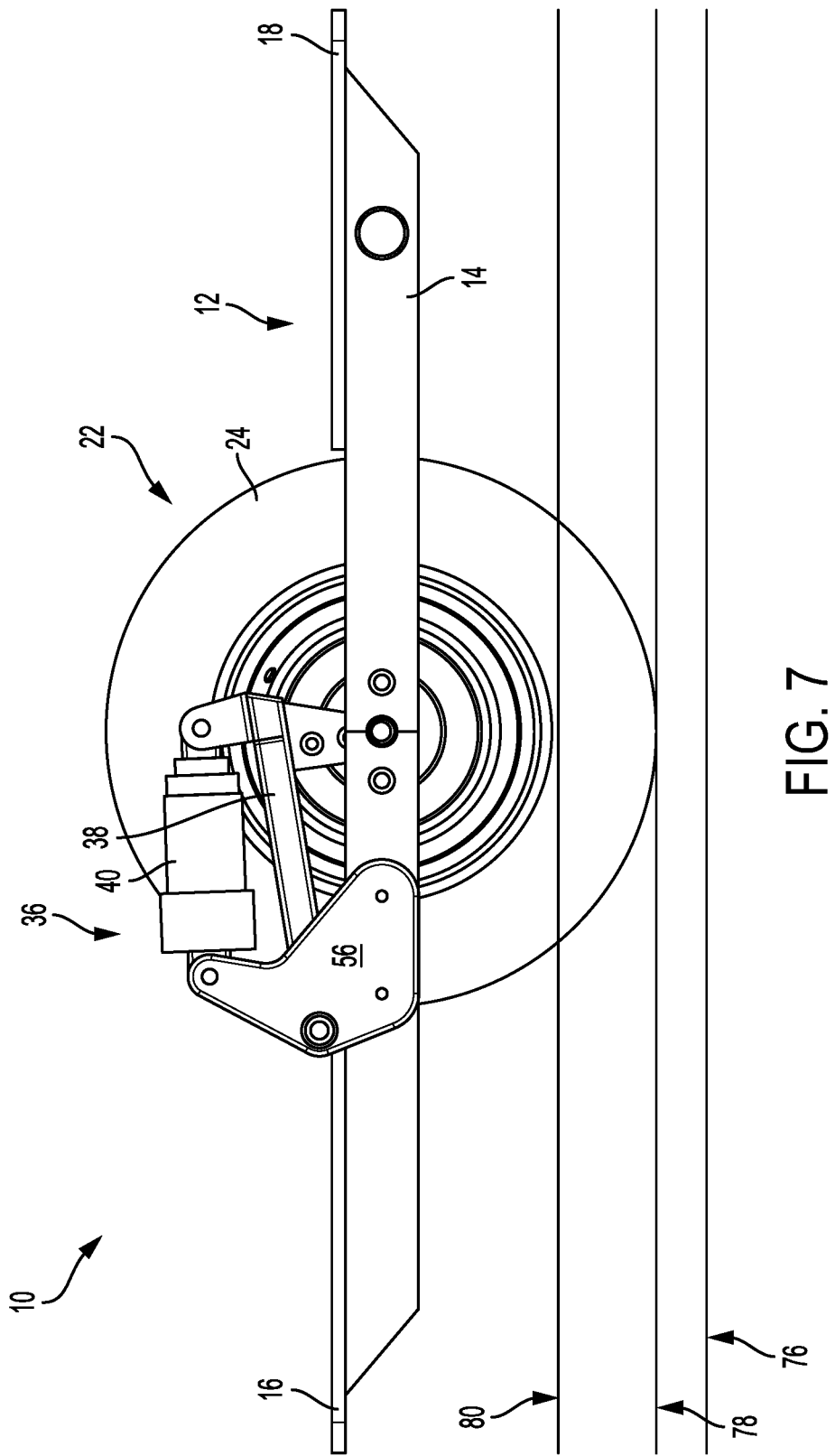
FIG. 7 is a side elevation view of the vehicle of FIG. 1 with the suspension system in a second state of compression.
Figure 8:
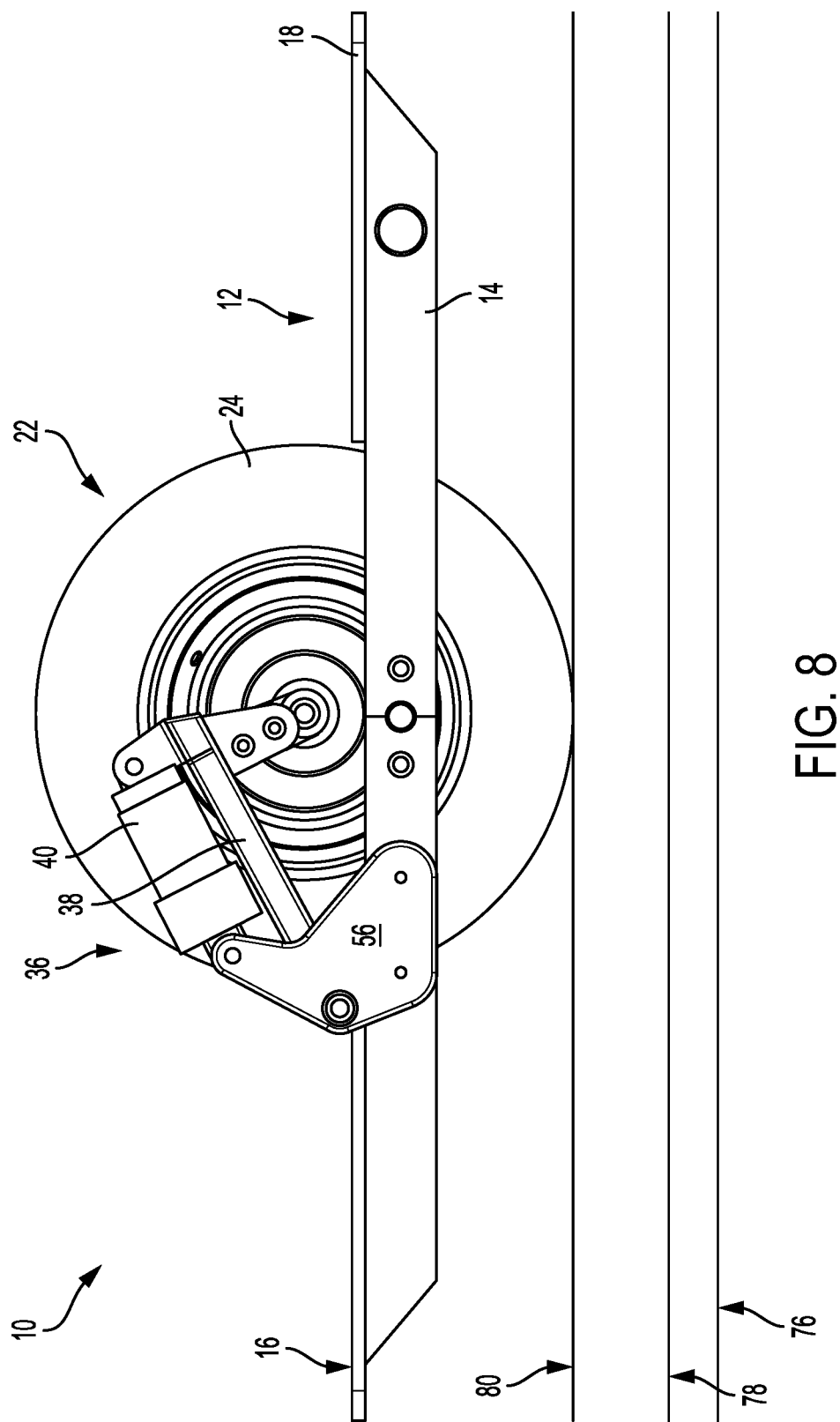
FIG. 8 is a side elevation view of the vehicle of FIG. 1 with the suspension system in a third state of compression.

FIGS. 1 and 2 are oblique isometric views of vehicle 10 and suspension system 36. FIG. 3 is an overhead plan view of vehicle 10 and suspension system 36. FIG. 4 is an oblique isometric view of suspension system 36 and axle/shaft 34, isolated from remaining components to show relationships between the various elements. FIG. 5 is an isometric view of suspension system 36, isolated from vehicle 10. FIGS. 6-8 are side elevation views of vehicle 10 and suspension system 36 in three respective states of compression, showing how the suspension system responds.

Suspension system 36 includes swingarm 38 and shock absorber 40, as mentioned above. Swingarm 38 is a substantially U-shaped structure having a pair of rigid, spaced-apart, elongate extension arms 42 and 44. Arms 42 and 44 extend longitudinally from a transverse, pivoting cross-member 46 (also referred to as a connecting member) to straddle wheel assembly 22 and tire 24.

More specifically, the respective distal ends of arms 42 and 44 are coupled to opposing ends of axle 34. For example, as shown in FIG. 4 and elsewhere, an end portion of arm 42 is attached (e.g., bolted) to a first axle mounting member 48, and an end portion of arm 44 is attached (e.g., bolted) to a second axle mounting member 50. Axle mounting members 48 and 50 may be referred to as axle mounts. Axle mounts 48 and 50 are rotatably or pivotably coupled to respective ends of axle 34, such that swingarm 38 can pivot with respect to the axle. In this example, axle mount 48 is pivotably coupled to the axle, e.g., using one or more bearings or the like. Axle mount 50 is pivotably coupled to an intermediate structure in the form of a torque arm 52. Torque arm 52 is non-rotatably coupled to an end of axle 34 (see below). An aperture of axle mount 50 fits over an axial protrusion 54 of torque arm 52.

At the proximal ends of arms 42 and 44, swingarm 38 is mounted to vehicle 10 by a pair of vertical frame mounting plates 56 and 58. Mounting plates 56 and 58 are affixed (e.g., bolted) to frame members 28 and 30 of board 12, and are configured to pivotably retain end portions of cross member 46. Frame mounting plates 56 and 58 (also referred to as plate members or coupling members) may include any suitable structure configured to couple suspension system 36 to board 12. In some examples, frame mounting plates 56 and 58 may be unitary with frame 14 and/or deck portion 16 and/or 18. In this example, mounting plates 56 and 58 are substantially planar, rigid plates bolted to the frame. Frame mounting plates 56 and 58 may provide additional mounting locations for other elements of suspension system 36, as described below.

Accordingly, swingarm 38 is pivotable at one end with respect to axle 34 and is pivotable at the other end with respect to board 12 and frame 14. This pivotable arrangement facilitates a swinging, generally vertical movement of wheel assembly 22. In other words, the wheel and tire can move up and down with respect to the board, through an arc corresponding to a radius defined by extension arms 42 and 44 (i.e., arcuate motion, also referred to as arcuately vertical).

However, this motion of the wheel is generally only desirable in response to a need, such as when riding the vehicle over a bump in the road or on uneven terrain. Furthermore, the motion should be controlled or damped to allow for rider control and comfort. Accordingly, suspension system 36 includes shock absorber 40, which is pivotably coupled to mounting plate 56 at a first end 60 and to the swingarm at a second end 62. Shock absorber 40 may include any suitable damping device. In this example, shock absorber 40 includes an air shock absorber, such as the mountain bike shock absorber sold under the brand name FOX FLOAT DPS. Damping characteristics of the shock may be adjustable or selectable. In some examples, the shock may include a lockout feature.

To offset and/or limit twisting of wheel assembly 22 and to ensure axle 34 (and the stator of motor 26 affixed thereto) does not spin with respect to frame 14 when power is applied to motor 26, torque arm 52 is connected between axle 34 and mounting plate 58 by a torque link 64. Torque link 64 may include any suitable rigid link, the length of which may be securably adjustable. Link 64 is pivotally connected at a first end 66 to mounting plate 58 and at a second end 68 by a ball joint 70 to torque arm 52.

As mentioned above, torque arm 52 is fixed to an end of axle 34, such that axle 34 cannot rotate with respect to the torque arm. In this example, axle 34 is keyed to torque arm 52 by a slot joint 72, visible in FIG. 5. Specifically, a squared off end portion of the axle fits into a channel 74 in torque arm 52, and the two are fastened together by an axial bolt. The channel prevents any relative rotation between the two components. Connecting another end of the torque arm directly to the mounting plate using torque link 64 generally holds the axle in a constant rotational orientation with respect to the frame of the vehicle as the wheel assembly moves up and down. As a consequence, the stator of the hub motor (which is affixed to the axle) is also held stationary (i.e., in a non-rotating state). Torque arm 52 and torque link 64 may be referred to as a pair of strut members forming a strut assembly.

As shown in the drawings, first ends 60 and 66 of the shock absorber and torque link, respectively, are spaced above frame 14 and cross member 46. Second ends 62 and 68 are spaced from axle 34, but are generally lower than the first ends when the system is not compressed (e.g., during steady-state operation).

Accordingly, system 36 includes two linkage assemblies, one at each end of shock absorber 40. Specifically, a first linkage assembly (e.g., mounting plates 56, 58) connects first end 60 of shock absorber 40 to board 12, and a second linkage assembly (e.g., swingarm 38) connects second end 62 of shock absorber 40 to wheel assembly 22. As described above, at least one member of one of the linkage assemblies is rotatable, and compression of the shock absorber allows the board to move relative to the wheel in response to bumps encountered by the wheel.

In some examples, swingarm 38 may connect the second end of the shock absorber to exactly one lateral side of the wheel. In some examples, swingarm 38 may comprise a dual-sided swingarm assembly that operatively connects the second end of the shock absorber to both lateral sides of the wheel. The first linkage assembly may be non-rotatably attached to the board, and rotatably attached to the shock absorber. The first linkage assembly may be attached to the board at two separated positions on one lateral side of the board. The first linkage assembly may be attached to the board at two separated positions on each lateral side of the board.

In some examples, the first linkage assembly includes first plate member 56 rigidly attached to a first side of board 12 and rotatably attached to first end 60 of shock absorber 40, second plate member 58 rigidly attached to a second side of board 12, and connecting member 46 joining the first and second plate members and rotatably attached to each of the first and second plate members.

In some examples, the second linkage assembly includes the strut assembly (e.g., torque link 64 and torque arm 52), such that the first strut member (i.e., torque link 64) has one end rotatably attached to second plate member 58 and another end rotatably attached to the second strut member (i.e., torque arm 52). The second strut member has one end non-rotatably attached to the wheel and another end rotatably attached to link 64. Accordingly, the first and second strut members are collectively configured (a) to allow the first linkage assembly to move symmetrically on each lateral side of the board, with respect to a plane defined by the board, and/or (b) to impede spinning of axle 34 with respect to frame 14 of board 12.

System 36 may include a linkage assembly linking the wheel to the board, where the linkage assembly includes first and second axial members (e.g., extension arms 42 and 44), each rotatably attached to a respective lateral side of the wheel. A connecting member (e.g., cross-member 46) rigidly interconnects the axial members. Shock absorber 40 has one end (e.g., end 62) coupled to the connecting member. At least one coupling member joins the other end of the shock absorber (e.g., end 60) to the board. The linkage assembly is configured to allow the riding plane of the board to move relative to the axis of rotation of the wheel, in response to bumps encountered by the wheel.

Turning to FIGS. 6-8, vehicle 10 is shown with suspension system 36 unloaded, partially compressed, and fully compressed, respectively. These conditions or states correspond to three different support surface levels, indicated at 76, 78, and 80. As shown in the drawings, as wheel assembly 22 is displaced upward, the distal ends of arms 42 and 44 of swingarm 38 (i.e., the ends proximate axle 34) are displaced upward as well. This compresses shock absorber 40, shortening the overall length of the shock. Because the shock absorber is designed to oppose such action, the resulting displacement of wheel assembly 22 is lesser in magnitude and slower in speed than would otherwise be the case for a given upward force. Shock absorber 40 may also bias the wheel to a default or steady-state position relative to the frame 14. Accordingly, wheel assembly 22 may be urged downward after the upward force is reduced, thereby tending to maintain the tire in contact with the support surface.

In some examples, aspects of suspension system 36 may be described as an inverted slider crank linkage mechanism. Specifically, such a linkage mechanism comprises three pivot joints and one sliding (i.e., prismatic) joint. Here, the three pivots are (1) at the pivoting cross member 46, (2) at first end 60 of shock 40, and (3) at second end 62 of shock 40. Finally, the prismatic joint is formed by the lengthwise compressibility of shock absorber 40 itself.

B. Illustrative Mono-Shock/Bell Crank Suspension

Figure 9:
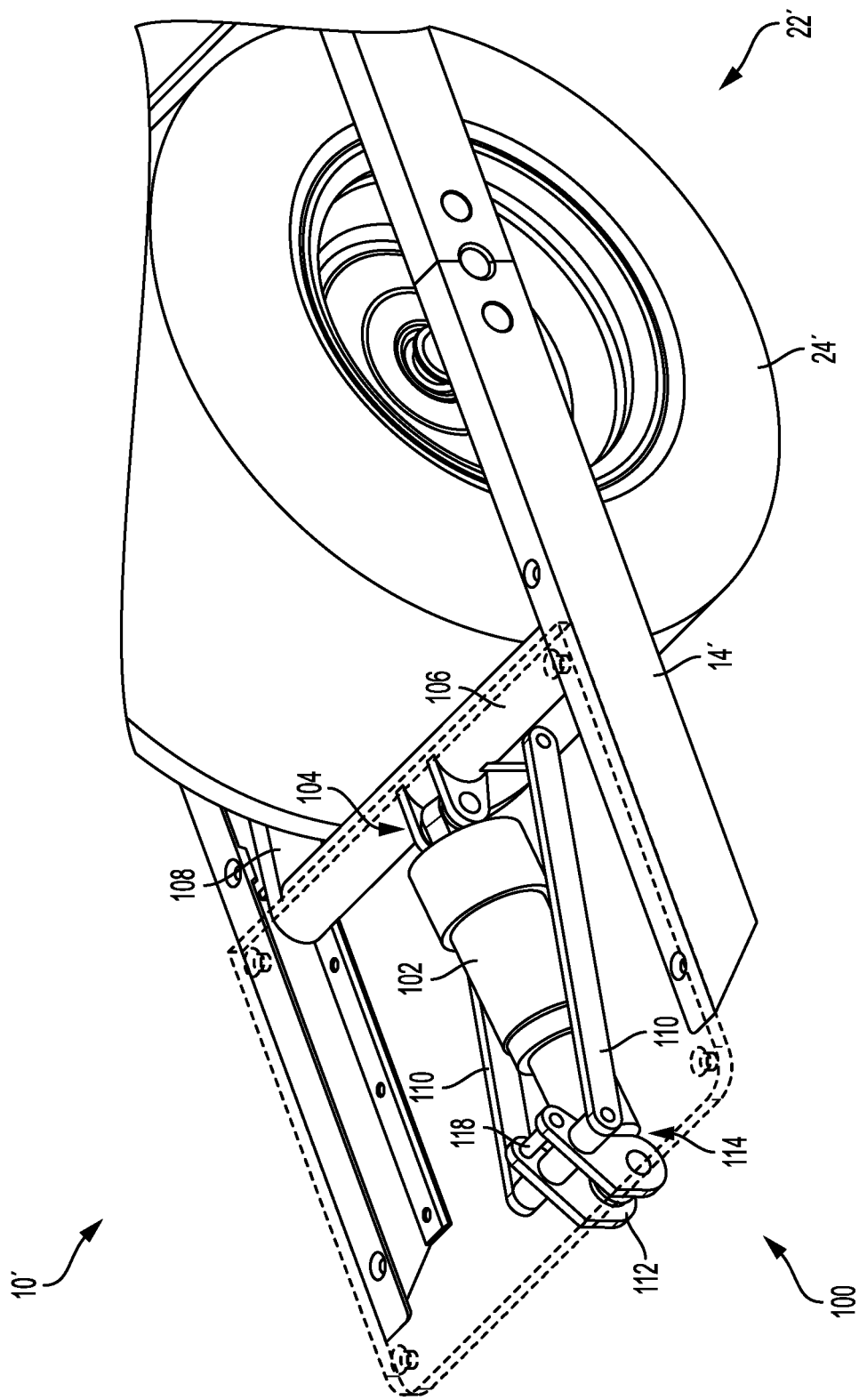
FIG. 9 is an isometric partial view of another illustrative vehicle having a suspension according to the present teachings.
Figure 10:
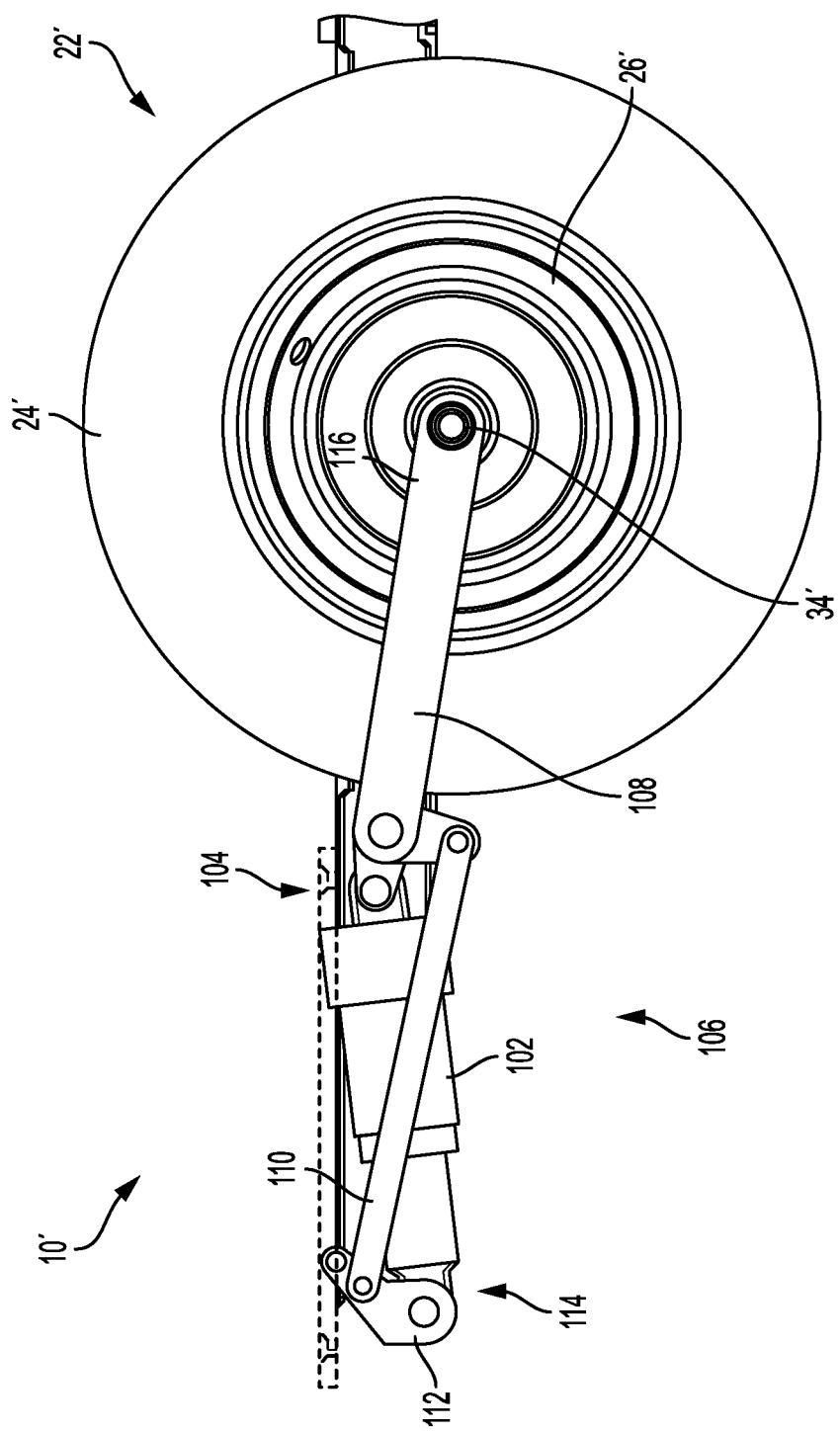
FIG. 10 is a side elevation partial view of the vehicle and suspension of FIG. 10.

As shown in FIGS. 9 and 10, this section describes another illustrative suspension system 100 suitable for use with vehicles such as vehicle 10. Relevant aspects of an illustrative vehicle substantially similar to vehicle 10 are shown, and are labeled with primed reference numbers (e.g., vehicle 10') for convenience. FIG. 9 is a partial isometric view of vehicle 10' and system 100. FIG. 10 is a partial side elevation view of vehicle 10', with a portion of the frame removed to better show system 100.

Suspension system 100 includes a shock absorber 102, which may be substantially similar to shock absorber 40 described above. Shock absorber 102 is pivotably coupled at a first end 104 to a cross-member 106 of a swing arm 108. The shock is coupled to a connection point on the cross-member at or near a midpoint of the cross-member, such that the shock absorber is centrally aligned with vehicle 10' and is disposed under (below) one of the deck portions of vehicle 10'.

In this example, swing arm 108 is directly coupled at a distal end 116 to axle 34' of wheel assembly 22'. Cross member 106 may be further connected to a pair of first links 110 on either side of the shock absorber, which are connected at their other ends to a second link 112. Second link 112 is further pivotably coupled to a second end 114 of shock absorber 102, and to the foot platform and/or frame 14' via a pivot pin 118 (or the like), as shown in the drawings.

Accordingly, upward force on wheel assembly 22' will cause a distal (axle) end 116 of swingarm 108 to pivot upward. This pivoting pulls first links 110 toward the axle and compresses shock 102. Releasing or unloading the wheel will have the reverse effect.

C. Illustrative Control System

Figure 11:
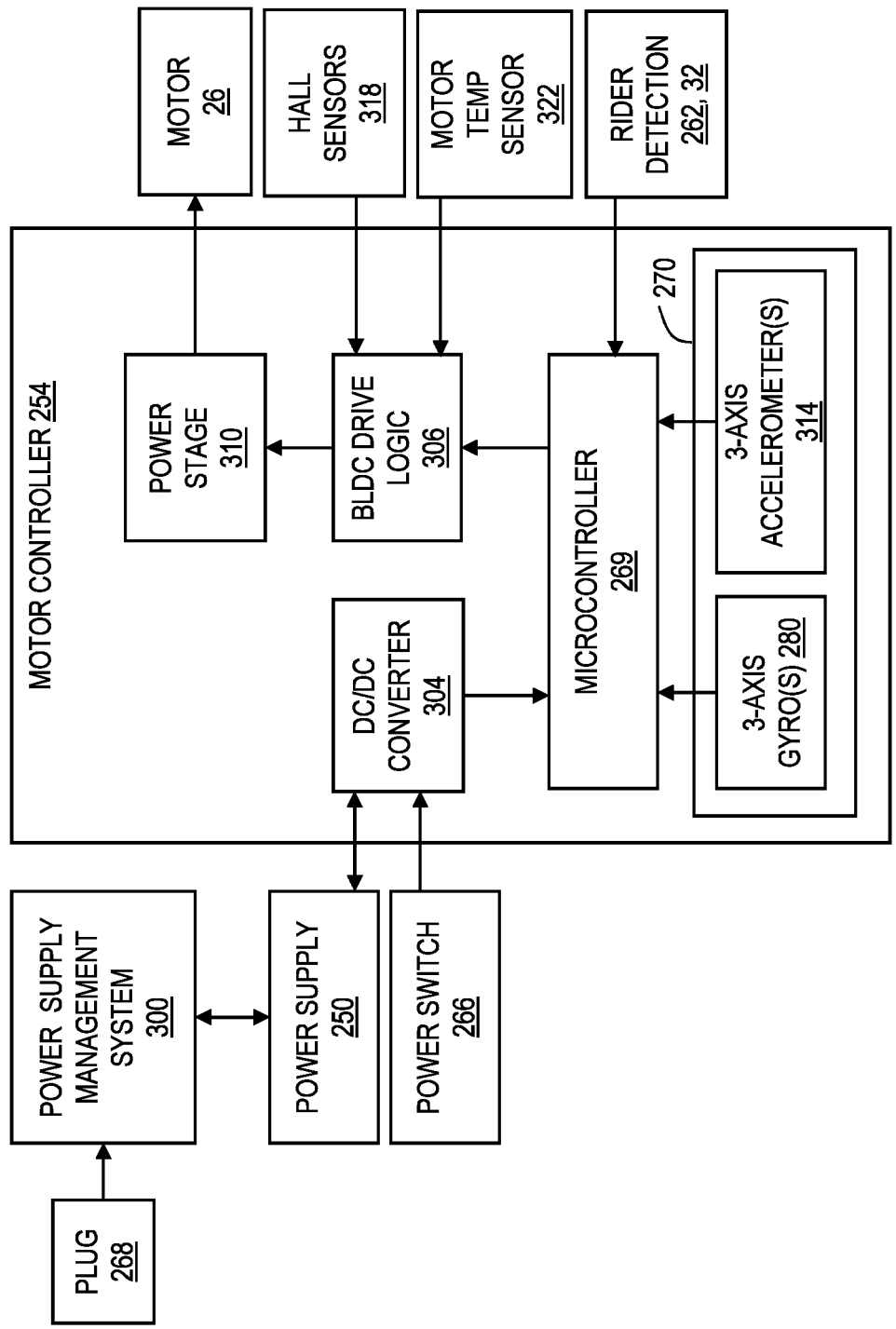
FIG. 11 is a schematic diagram depicting illustrative onboard controls and electronic components suitable for use with vehicles in accordance with aspects of the present disclosure.

FIG. 11 shows a block diagram of various illustrative electrical components of vehicle 10 (or 10'), including onboard controls, some or all of which may be included in vehicle 10 (or 10'). The electrical components may include a power supply management system 300, a direct current to direct current (DC/DC) converter 304, a brushless direct current (BLDC) drive logic 306, a power stage 310, one or more 3-axis accelerometer 314, one or more hall sensors 318, and/or a motor temperature sensor 322. DC/DC converter 304, BLDC drive logic 306, and power stage 310 may be included in and/or connected to a motor controller 254. Accelerometer(s) 314 may be included in sensors 270.

Active balancing (or self-stabilization) of the electric vehicle may be achieved through the use of a feedback control loop or mechanism. The feedback control mechanism may include sensors 270, which may be electrically coupled to and/or included in motor controller 254. Preferably, the feedback control mechanism includes a Proportional-Integral-Derivative (PID) control scheme using one or more gyros (e.g., gyro(s) 280) and one or more accelerometers (e.g., accelerometer(s) 314). Gyro 280 may be configured to measure a pivoting of the foot deck about its pitch axis. Gyro 280 and accelerometer 314 may be collectively configured to estimate (or measure, or sense) a lean angle of board 12, such as an orientation of the foot deck about the pitch, roll and/or yaw axes. In some embodiments, the gyro and accelerometer 314 may be collectively configured to sense orientation information sufficient to estimate the lean angle of frame 14 including pivotation about the pitch, roll and/or yaw axes.

As mentioned above, orientation information of board 12 may be measured (or sensed) by gyro 280 and accelerometer 314. The respective measurements (or sense signals) from gyro 280 and accelerometer 314 may be combined using a complementary or Kalman filter to estimate a lean angle of board 12 (e.g., pivoting of board 12 about the pitch, roll, and/or yaw axes, with pivoting about the pitch axis corresponding to a pitch angle (about axle 34), pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 280 and accelerometer 314 may be connected to microcontroller 269, which may be configured to correspondingly measure movement of board 12 about and along the pitch, roll, and yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive motor 26 to reduce an angle of board 12 with respect to the ground. For example, if a rider were to angle board 12 downward, so that first deck portion 16 was 'lower' than second deck portion 18 (e.g., if the rider pivoted board 12 counterclockwise (CCW) about axle 34 in FIG. 1), then the feedback loop may drive motor 26 to cause CCW rotation of tire 24 about the pitch axis (i.e., axle 34) and a clockwise force on board 12.

Thus, motion of the electric vehicle may be achieved by the rider leaning his or her weight toward a selected (e.g., "front") foot. Similarly, deceleration may be achieved by the rider leaning toward the other (e.g., "back") foot. Regenerative braking can be used to slow the vehicle. Sustained operation may be achieved in either direction by the rider maintaining their lean toward either selected foot.

As indicated in FIG. 11, microcontroller 269 may be configured to send a signal to BLDC drive logic 306, which may communicate information relating to the orientation and motion of board 12. BLDC drive logic 306 may then interpret the signal and communicate with power stage 310 to drive motor 144 accordingly. Hall sensors 318 may send a signal to the BLDC drive logic to provide feedback regarding a substantially instantaneous rotational rate of the rotor of motor 26. Motor temperature sensor 322 may be configured to measure a temperature of motor 26 and send this measured temperature to logic 306. Logic 306 may limit an amount of power supplied to motor 26 based on the measured temperature of motor 26 to prevent motor 26 from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measure or estimated pitch angle of board 12).

Alternatively or additionally, some embodiments may include neural network control, fuzzy control, genetic algorithm control, linear quadratic regulator control, state-dependent Riccati equation control, and/or other control algorithms. In some embodiments, absolute or relative encoders may be incorporated to provide feedback on motor position.

As mentioned above, during turning, the pitch angle can be modulated by the heel-toe angle (e.g., pivoting of the board about the roll axis), which may improve performance and prevent a front inside edge of board 12 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 11, the various electrical components may be configured to manage power supply 250. For example, power supply management system 300 may be a battery management system configured to protect batteries of power supply 250 from being overcharged, over-discharged, and/or short-circuited. System 300 may monitor battery health, may monitor a state of charge in power supply 250, and/or may increase the safety of the vehicle. Power supply management system 300 may be connected between a charge plug 268 of vehicle 10 and power supply 250. The rider (or other user) may couple a charger to plug 268 and re-charge power supply 250 via system 300.

In operation, power switch 266 may be activated (e.g., by the rider). Activation of switch 266 may send a power-on signal to converter 304. In response to the power-on signal, converter 304 may convert direct current from a first voltage level provided by power supply 250 to one or more other voltage levels. The other voltage levels may be different than the first voltage level. Converter 304 may be connected to the other electrical components via one or more electrical connections to provide these electrical components with suitable voltages.

Converter 304 (or other suitable circuitry) may transmit the power-on signal to microcontroller 269. In response to the power-on signal, microcontroller may initialize sensors 270, and rider detection device 262.

The electric vehicle may include one or more safety mechanisms, such as power switch 266 and/or rider detection device 262 to ensure that the rider is on the board before engaging the feedback control loop. In some embodiments, rider detection device 262 may be configured to determine if the rider's feet are disposed on the foot deck, and to send a signal causing motor 144 to enter an active state when the rider's feet are determined to be disposed on the foot deck.

Rider detection device 262, an example of which is depicted as rider detection system 32 in FIGS. 1-2, may include any suitable mechanism, structure, or apparatus for determining whether the rider is on the electric vehicle. For example, device 262 may include one or more mechanical buttons, one or more capacitive sensors, one or more inductive sensors, one or more optical switches, one or more force resistive sensors, and/or one or more strain gauges. Rider detection device 262 may be located on or under either or both of first and second deck portions 16, 18 (see FIGS. 1-2). In some examples, the one or more mechanical buttons or other devices may be pressed directly (e.g., if on the deck portions), or indirectly (e.g., if under the deck portions), to sense whether the rider is on board 12. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, device 262 may include a hand-held "dead-man" switch.

If device 262 detects that the rider is suitably positioned on the electric vehicle, then device 262 may send a rider-present signal to microcontroller 269. The rider-present signal may be the signal causing motor 26 to enter the active state. In response to the rider-present signal (and/or the board being moved to the level orientation), microcontroller 269 may activate the feedback control loop for driving motor 144. For example, in response to the rider-present signal, microcontroller 269 may send board orientation information (or measurement data) from sensors 270 to logic 306 for powering motor 26 via power stage 310.

In some embodiments, if device 262 detects that the rider is no longer suitably positioned or present on the electric vehicle, device 262 may send a rider-not-present signal to microcontroller 269. In response to the rider-not-present signal, circuitry of vehicle 10 (e.g., microcontroller 269, logic 306, and/or power stage 310) may be configured to reduce a rotational rate of the rotor relative to the stator to bring vehicle 10 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 26 even though the rider may not be present on the vehicle (e.g., temporarily), which may allow the rider to perform various tricks. For example, device 262 may be configured to delay sending the rider-not-present signal to the microcontroller for a predetermined duration of time, and/or the microcontroller may be configured to delay sending the signal to logic 306 to cut power to the motor for a predetermined duration of time.

D. Selected Embodiments and Claim Concepts

This section describes additional aspects and features of suspension systems for one-wheeled vehicles, presented without limitation as a series of paragraphs, some or all of which may be alphanumerically designated for clarity and efficiency. Each of these paragraphs can be combined with one or more other paragraphs, and/or with disclosure from elsewhere in this application, including materials listed in the Cross-References, in any suitable manner. Some of the paragraphs below may expressly refer to and further limit other paragraphs, providing without limitation examples of some of the suitable combinations.

Z0. An electric vehicle, comprising:
a board including first and second deck portions each configured to receive a left or right foot of a rider oriented generally perpendicular to a longitudinal axis of the board;
a wheel assembly including a ground-contacting element disposed between and extending above the first and second deck portions;
a motor assembly mounted to the wheel assembly and configured to rotate the ground-contacting element around an axle to propel the electric vehicle;
at least one orientation sensor configured to measure orientation information of the board;
a motor controller configured to receive board orientation information measured by the orientation sensor and to cause the motor assembly to propel the electric vehicle based on the board orientation information; and
a suspension system including a shock absorber operatively coupled to a swingarm having a proximal end pivotably coupled to the board and a distal end coupled to the axle, such that the board is displaceable relative to the axle along an arcuate, generally vertical path.

Z1. The vehicle of Z0, wherein the shock absorber is coupled to the swingarm and the board on a first side of the wheel assembly, the suspension system further including a torque arm coupled to the axle and the board on a second side of the wheel assembly.

A0. A shock absorbing, self-balancing electric skateboard, comprising:
a board including first and second deck portions each configured to receive a left or right foot of a rider oriented generally perpendicular to a direction of travel of the board;
a wheel assembly including exactly one rotatable wheel disposed between and extending above the first and second deck portions;
a motor assembly configured to rotate the wheel around an axle to propel the skateboard;
at least one sensor configured to measure orientation information of the board;
a motor controller configured to receive orientation information measured by the sensor and to cause the motor assembly to propel the skateboard based on the orientation information;
a compressible shock absorber;
a first linkage assembly connecting a first end of the shock absorber to the board; and
a second linkage assembly connecting a second end of the shock absorber to the wheel;
wherein at least one member of one of the linkage assemblies is rotatable on an axis extending perpendicular to the direction of travel of the board, and wherein compression of the shock absorber is configured to allow the board to move relative to the wheel in response to bumps encountered by the wheel.

A1. The electric skateboard of A0, wherein the second linkage assembly is a single-sided swingarm assembly that connects the second end of the shock absorber to exactly one lateral side of the wheel.

A2. The electric skateboard of any of paragraphs A0 through A1, wherein the second linkage assembly is a dual-sided swingarm assembly that operatively connects the second end of the shock absorber to both lateral sides of the wheel.

A3. The electric skateboard of any of paragraphs A0 through A2, wherein the first linkage assembly is non-rotatably attached to the board, and rotatably attached to the shock absorber.

A4. The electric skateboard of A3, wherein the first linkage assembly is attached to the board at two separated positions on one lateral side of the board.

A5. The electric skateboard of A4, wherein the first linkage assembly is attached to the board at two separated positions on each lateral side of the board.

A6. The electric skateboard of A5, wherein the first linkage assembly includes a first plate member rigidly attached to a first side of the board and rotatably attached to the first end of the shock absorber, a second plate member rigidly attached to a second side of the board, and a connecting member joining the first and second plate members and rotatably attached to each of the first and second plate members.

A7. The electric skateboard of A6, wherein the first linkage assembly comprises a strut assembly including first and second strut members, the first strut member having one end rotatably attached to the second plate member and another end rotatably attached to the second strut member, the second strut member having one end non-rotatably attached to the wheel and another end rotatably attached to the first strut member, wherein the first and second strut members are collectively configured to allow the first linkage assembly to move symmetrically on each lateral side of the board, with respect to a plane defined by the board.

A8. The electric skateboard of A6, wherein the first linkage assembly includes first and second strut members, the first strut member having one end rotatably attached to the second plate member and another end rotatably attached to the second strut member, the second strut member having one end non-rotatably attached to an axle of the wheel and another end rotatably attached to the first strut member, wherein the first and second strut members are collectively configured to impede spinning of the axle relative to the board.

B0. A self-balancing electric vehicle, comprising:
a board defining a riding plane and including first and second deck portions each configured to receive a left or right foot of a rider oriented generally perpendicular to a direction of travel of the board;
at least one rotatable wheel disposed between the first and second deck portions, and extending above and below the board;
a hub motor configured to rotate the wheel to propel the vehicle;
at least one sensor configured to measure orientation information of the board;
a motor controller configured to receive orientation information measured by the sensor and to cause the hub motor to propel the skateboard based on the orientation information;
a compressible shock absorber; and
a linkage assembly operatively connecting one end of the shock absorber to the board and another end of the shock absorber to the wheel, wherein compression of the shock absorber is configured to allow arcuate, generally vertical motion of the at least one wheel relative to the riding plane as the wheel encounters obstacles.

B1. The electric vehicle of B0, wherein the at least one rotatable wheel includes exactly one rotatable wheel.

B2. The electric vehicle of any of paragraphs B0 through B1, wherein the at least one rotatable wheel includes two wheels disposed side by side and sharing a common axis of rotation.

B3. The electric vehicle of any of paragraphs B0 through B2, wherein the linkage assembly is a single-sided swingarm assembly connecting the shock absorber to exactly one lateral side of the wheel.

B4. The electric vehicle of any of paragraphs B0 through B3, wherein the linkage assembly is a dual-sided swingarm assembly connecting the shock absorber to both lateral sides of the wheel.

C0. A self-balancing electric vehicle, comprising:
a board defining a riding plane and configured to receive left and right feet of a rider oriented generally perpendicular to a direction of travel of the board;
at least one rotatable wheel disposed between and extending above and below the board;
a motor configured to rotate the wheel around an axis of rotation to propel the vehicle;
at least one sensor configured to measure orientation information of the board;
a motor controller configured to receive orientation information measured by the sensor and to cause the motor to propel the skateboard based on the orientation information; and
a linkage assembly linking the wheel to the board, the linkage assembly including:
first and second extension arms, each rotatably attached to a respective lateral side of the wheel;
a connecting member rigidly interconnecting the extension arms;
a shock absorber having a first end coupled to the connecting member; and
a first coupling member joining a second end of the shock absorber to the board;
wherein the linkage assembly is configured to allow the riding plane of the board to move in an arcuate, generally vertical direction relative to the axis of rotation of the at least one wheel, in response to bumps encountered by the wheel.

C1. The electric vehicle of C0, wherein the linkage assembly further includes a strut assembly having a first end affixed to an axle of the wheel, and the first coupling member joins the second end of the shock absorber to a first lateral side of the board and a second coupling member joins a second end of the strut assembly to a second lateral side of the board.

C2. The electric vehicle of C1, wherein the strut assembly includes first and second strut members pivotably joined together.

C3. The electric vehicle of C1, wherein the first and second coupling members are parallel planar members each rigidly attached to a respective lateral side of the board.

C4. The electric vehicle of C3, wherein each coupling member is attached to the board at two separated attachment points.

C5. The electric vehicle of any of paragraphs C0 through C4, wherein the at least one wheel includes two wheels sharing a common axis of rotation.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for absorbing shocks encountered by a self-balancing electric vehicle, the method comprising:
rotating a wheel of a one-wheeled vehicle around an axle using a motor assembly, the vehicle including a board tiltable about a tilt axis oriented perpendicular to a direction of travel, wherein the vehicle is configured to receive left and right feet of a rider oriented generally parallel to the tilt axis;
measuring tilt orientation information of the board using at least one sensor;
based on the tilt orientation information, using a motor controller to cause the motor assembly to propel the vehicle; and
compressing and expanding a shock absorber in response to the board moving relative to the axle as a result of wheel movement during operation;
wherein the shock absorber comprises a first linkage assembly connecting a first end of the shock absorber to the board, and a second linkage assembly connecting a second end of the shock absorber to the wheel; and
wherein at least one member of one of the linkage assemblies is rotatable on an axis extending perpendicular to the direction of travel of the board.

2. The method of claim 1, wherein the second linkage assembly is a single-sided swingarm assembly that connects the second end of the shock absorber to exactly one lateral side of the wheel.

3. The method of claim 1, wherein the second linkage assembly is a dual-sided swingarm assembly that operatively connects the second end of the shock absorber to both lateral sides of the wheel.

4. The method of claim 1, wherein the first linkage assembly is non-rotatably attached to the board, and rotatably attached to the shock absorber.

5. The method of claim 4, wherein the first linkage assembly is attached to the board at two separated positions on one lateral side of the board.

6. The method of claim 5, wherein the first linkage assembly is attached to the board at two separated positions on each lateral side of the board.

7. The method of claim 6, wherein the first linkage assembly includes a first plate member rigidly attached to a first side of the board and rotatably attached to the first end of the shock absorber, a second plate member rigidly attached to a second side of the board, and a connecting member joining the first and second plate members and rotatably attached to each of the first and second plate members.

8. The method of claim 7, wherein the first linkage assembly comprises a strut assembly including a pair of strut members, a first strut member of the pair having one end rotatably attached to the second plate member and another end rotatably attached to a second strut member of the pair, the second strut member having one end non-rotatably attached to the wheel and another end rotatably attached to the first strut member.

9. The method of claim 8, further comprising:
causing the first linkage assembly to move symmetrically on each lateral side of the board, with respect to a plane defined by the board, using the pair of strut members.

10. The method of claim 8, further comprising:
impeding spinning of the axle relative to the board, using the pair of strut members.

11. A method for absorbing shocks encountered by a self-balancing electric vehicle, the method comprising:
rotating a wheel of an electric vehicle around an axis of rotation using a motor assembly, the vehicle including a tiltable board, wherein the board defines a riding plane and is configured to receive left and right feet of a rider oriented generally parallel to the axis of rotation;
measuring tilt orientation information of the board using at least one sensor;
based on the tilt orientation information, using a motor controller to cause the motor assembly to propel the vehicle; and
in response to bumps encountered by the wheel, allowing the riding plane of the board to move in an arcuate, generally vertical direction relative to the axis of rotation of the wheel, using a linkage assembly linking the wheel to the board;
wherein the linkage assembly includes:
first and second extension arms, each rotatably attached to a respective lateral side of the wheel;
a connecting member rigidly interconnecting the extension arms;
a shock absorber having a first end coupled to the connecting member; and
a first coupling member joining a second end of the shock absorber to the board.

12. The method of claim 11, wherein the linkage assembly further includes a strut assembly having a first end affixed to an axle of the wheel, and the first coupling member joins the second end of the shock absorber to a first lateral side of the board and a second coupling member joins a second end of the strut assembly to a second lateral side of the board.

13. The method of claim 12, wherein the strut assembly includes first and second strut members pivotably joined together.

14. The method of claim 12, wherein the first and second coupling members are parallel planar members each rigidly attached to a respective lateral side of the board.

15. The method of claim 14, wherein each coupling member is attached to the board at two separated attachment points.

16. The method of claim 11, including two wheels sharing the axis of rotation.

17. A method for absorbing shocks encountered by a self-balancing electric vehicle, the method comprising:
rotating a wheel of a one-wheeled vehicle around an axle using a motor assembly, the vehicle including a board tiltable about a tilt axis oriented perpendicular to a direction of travel, wherein the board includes first and second deck portions each configured to receive a left or a right foot of a rider;
measuring tilt orientation information of the board using at least one sensor;
based on the tilt orientation information, using a motor controller to cause the motor assembly to propel the vehicle; and
using a suspension system to absorb shocks when the board moves relative to the axle during operation;
wherein the suspension system includes a shock absorber operatively coupled to a swingarm having a proximal end pivotably coupled to the board and a distal end coupled to the axle, such that the board is displaceable relative to the axle along an arcuate, generally vertical path; and
wherein the shock absorber is coupled to the swingarm and the board on a first side of the wheel, the suspension system further including a torque arm coupled to the axle and the board on a second side of the wheel.

18. The method of claim 17, wherein the wheel comprises a ground-contacting element extending above the first and second deck portions.

19. The method of claim 17, further comprising:
using the torque arm to hold the axle in a constant rotational orientation with respect to the board as the wheel moves up and down.

20. The method of claim 19, wherein the torque arm is coupled to the board by a torque link.

* * * * *